(12) United States Patent
Hyde

(10) Patent No.: US 6,278,247 B1
(45) Date of Patent: Aug. 21, 2001

(54) MULTI-RESOLUTION DRIVE FOR ACTUATORS

(76) Inventor: Tristram Tupper Hyde, 7822 N. 8$^{th}$ St., Phoenix, AZ (US) 85020

( * ) Notice: Subject to any disclaimer, the term of this patent is extended or adjusted under 35 U.S.C. 154(b) by 0 days.

(21) Appl. No.: 09/342,074

(22) Filed: Jun. 28, 1999

(51) Int. Cl.$^7$ .......................... H02K 33/12; H02K 41/02
(52) U.S. Cl. ......................... 318/135; 310/12; 335/266; 335/277
(58) Field of Search ..................... 310/12, 13; 335/266, 335/268, 269, 271, 277; 359/824; 318/115, 135, 611, 724

(56) References Cited

U.S. PATENT DOCUMENTS

| | | | |
|---|---|---|---|
| 3,984,706 | * 10/1976 | Inouye | 310/12 |
| 4,075,517 | * 2/1978 | Adler | 310/13 |
| 4,318,038 | * 3/1982 | Munehiro | 318/135 |
| 4,612,592 | * 9/1986 | Frandsen | 360/106 |
| 4,669,013 | * 5/1987 | Scranton et al. | 360/106 |
| 4,751,437 | * 6/1988 | Gerard | 310/13 |
| 5,091,665 | * 2/1992 | Kelly | 310/12 |
| 5,541,777 | * 7/1996 | Sakamoto et al. | 310/13 |
| 5,653,317 | * 8/1997 | Wakui | 188/378 |
| 6,018,431 | * 1/2000 | Carlson et al. | 360/60 |
| 6,021,991 | * 2/2000 | Mayama et al. | 188/267 |

* cited by examiner

*Primary Examiner*—Burton Mullins
(74) *Attorney, Agent, or Firm*—Charles J. Ungemach

(57) ABSTRACT

An actuator positioned in accordance with two signals, the first being predominant and having a noise portion of magnitude which would mask the second signal and wherein the first signal is filtered to remove the noise and is connected to the actuator independently of the second signal so that the resultant motion of the actuator is additive of the two signals.

10 Claims, 1 Drawing Sheet

MULTI-RESOLUTION DRIVE FOR ACTUATORS

BACKGROUND OF THE INVENTION

1. Field of the Invention

The present invention relates to actuators, and more particularly to the drive for actuators, which may contain two or more inputs, one of which may be many times larger than the other.

2. Description of the Prior Art

Actuators which may be used, for example, to position a device in a desired attitude are well-known in the art. The device is positioned by a first signal, herein called the coarse signal, usually from a computer through an amplifier to the actuator. The device being positioned may also be subject to undesirable changes of position due to, for example, vibration. To avoid this problem, an additional actuator has been heretofore employed to provide a second positioning signal, herein called the fine signal, to counteract the vibration. The fine signals may be several orders of magnitude smaller than the coarse, and so the problem of noise in the coarse signal presents a special problem since it may be in the same general magnitude as the fine signals. If an attempt to drive the actuator from a combination of the coarse and fine signals is made, the noise in the coarse signal may swamp the fine signal so that the fine signals are lost. If the noise is filtered out by a low pass filter, then the fine signals may very well be filtered out also. Using a separate actuator for the fine signals is expensive, heavy and often nearly impossible without adding a second platform or stage for the device being positioned.

BRIEF DESCRIPTION OF THE INVENTION

In the present invention, an actuator in the form of a voice coil is used and wherein the windings around the armature are two-fold. The main windings are from the coarse controller and are relatively large in number, while the fine signals are presented to a smaller number of coils around the same armature. The result is that the noise in the coarse signal may be filtered out without affecting the fine signal.

DETAILED DESCRIPTION OF THE PREFERRED EMBODIMENTS

Figure 1:
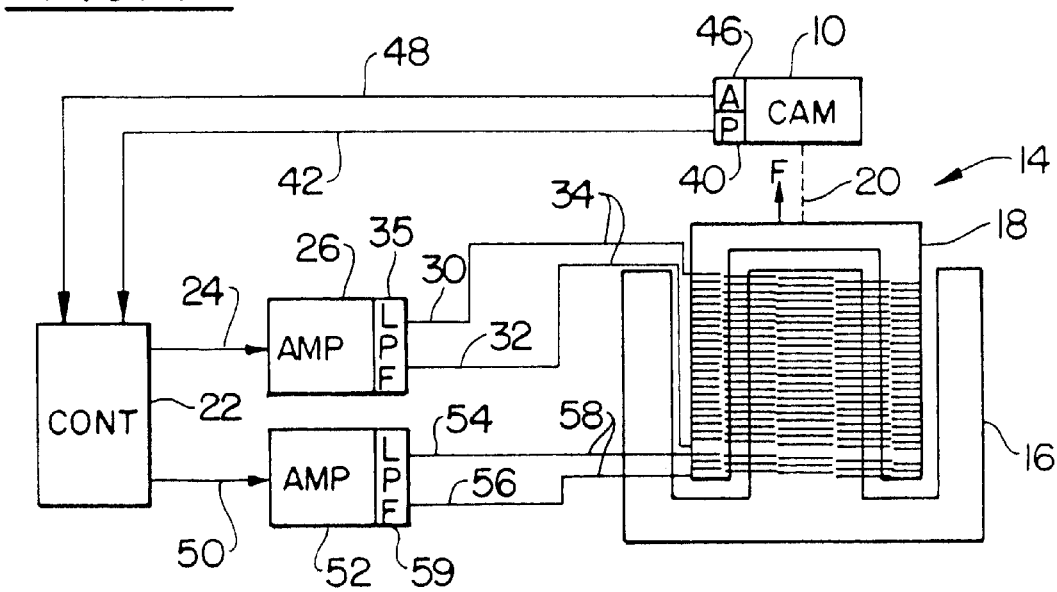
FIG. 1 is a block diagram of the present invention.
Figure 2:
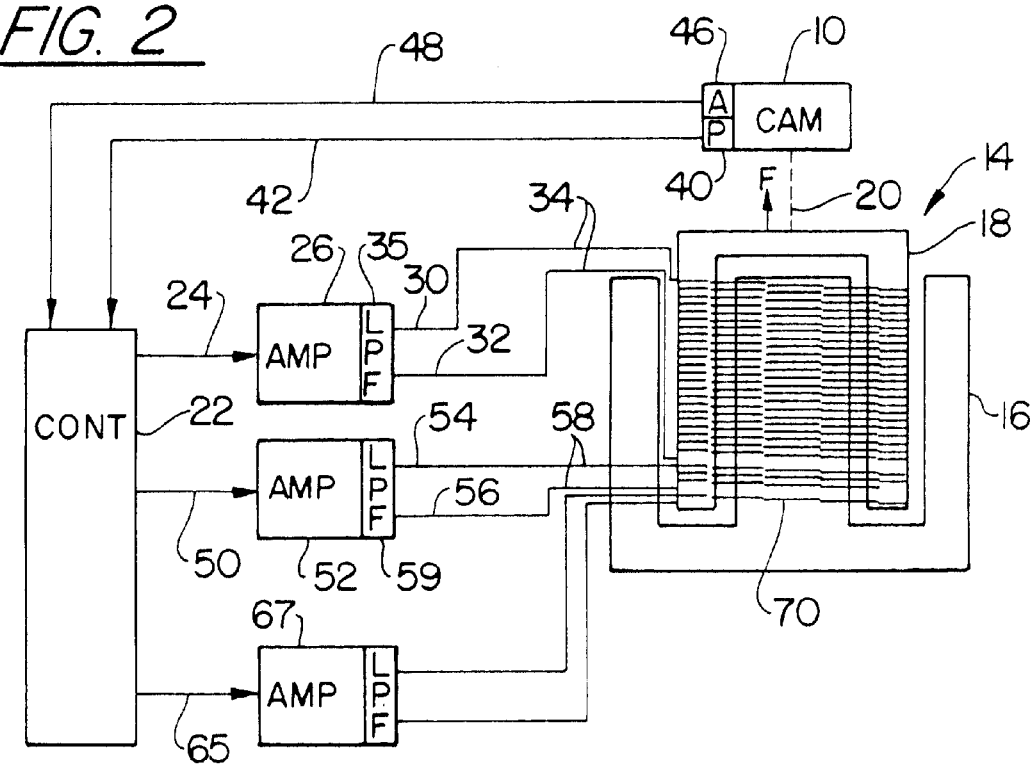
FIG. 2 is a block diagram of a second embodiment of the present invention.

In FIG. 1, a device to be controlled which, for purposes of this description will be considered to be a camera 10 is positioned by an actuator 14, in the form of a voice coil having an stator 16 and a movable armature 18, which operates to position camera 10 through a mechanical connection shown as dashed line 20.

A position controller, 22, which may be a computer, is shown having a first output on a line 24 which feeds the input of an amplifier 26. Amplifier 26 provides an output current, $i_{coarse}$, at two output terminals 30 and 32 which are connected to a wire 34 wrapped a number of times, N, around the armature of the voice coil 14. Amplifier 26 preferably has an associated low pass filter, 35, which filters out the noise, and the output current, $i_{coarse}$, acting through N turns, causes the armature 18 to exert a force F, on camera 10 through the mechanical connection 20. A position feedback shown by box 40 returns a signal via line 42 to controller 22 so that the motion caused by force, F, controls the camera 10 to the desired position.

A sensor shown by box 46, which may be an accelerometer, produces a signal on a line 48 to controller 22 informing the computer of the vibration which the camera 10 may be experiencing. Since the vibration effect is at least an order of magnitude smaller than the position effect, if the two signals were added directly, the noise in the position signal would be of the same magnitude as the vibration signal and would tend to mask it out. To avoid this, controller 22 produces an antivibration signal on an output line 50 which generally will be smaller in magnitude than the position signal on line 24. The signal on line 50 is presented to an amplifier 52 which produces an output current, $i_{fine}$, at output terminals 54 and 56 connected to a wire 58 which is wrapped a number of times, n, around the armature of the voice coil 14. In the normal situation, the output of amplifier 52 is of the same general order of magnitude as the output of amplifier 26 and accordingly, the number of turns, N, is made to be much larger than the number of turns, n. In some cases, amplifier 52 may have a very small output compared to the output of amplifier 26 in which case, the number of turns, N, need not be so very much larger than n. The important feature is that the force produced by the antivibration signal be proportionately smaller than the force produced by the position control signal. This would normally be at least one order of magnitude. This is most easily accomplished by adjusting the number of turns N, to the number of turns n. Amplifier 52 may have an associated low pass filter, 59, therein to filter out any noise but the magnitude of this noise is so small that filter 59 is probably not necessary. The output current $i_{fine}$ adds a small force to the positioning force F which operates to null the vibration.

The force F may be expressed by the equation:

$$F = B(Ni_{coarse} + ni_{fine})$$

Where B is a constant of magnitude which depends on the size and geometry of the magnetics in voice coil actuator, 14.

It is seen that by using a single actuator with two coils activating the armature, one coil having many turns and exerting a large influence on the movement of the armature and the other coil having few turns and exerting a proportionately smaller influence on the movement of the armature, a single actuator may be used. The position being controlled by the larger armature movement and any vibration which may exist being cancelled by the smaller movement. It is also seen that the noise in the larger signal can be filtered out without affecting the smaller signal for the vibration.

If desired, a third correction could be added in cases where a third and yet smaller variable is desired to be added to the force F. In this event, as seen in FIG. 3, a third output, 65, from controller 22 would feed a third amplifier, 67, to produce a third, and yet smaller, current into a third winding, 70, around armature 18 to produce a third factor into the force F of considerably less effect than the position signal and the antivibration signal. When the third output is small enough to be swamped by the noise in the second signal, then the second output would be separately filtered, as shown, and the third output independently connected to the coil 70, as shown, to provide protection in the same manner as the first and second outputs avoid the second output from being swamped by the first output.

It is therefore seen that I have provided a novel actuator requiring only one movable force exerting device and which produces an output force of magnitude dependent upon the main force plus additional smaller forces that might be desirable to use without allowing the noise which may exist in the larger force to mask the effect of the smaller forces. Many changes will occur to those having skill in the art. For example, while a camera-positioning device has been used in the description of the preferred embodiment, there are many other devices such as telescopes, mirrors, antennas etc., which can use the present invention, and while a voice coil type actuator has been used in the description of the preferred embodiment, there are many other actuators such as piezoelectric, electrostatic, motors, etc., which can use the present invention. I therefore do not wish to be limited to the structures and methods described in presenting the preferred embodiment but rather intend to rely on the claims to define the scope of the invention.

What is claimed is:

1. An actuator comprising:

a magnetic device having a stator and a movable armature operable to produce a force F;

a source of a first signal indicative of a first desired movement of the armature;

a source of a second signal indicative of a second movement of the armature wherein the noise in the first signal is of magnitude at least as great as the magnitude of the second signal;

a first conductor coil wrapped around the armature and connected to the source of first signal to cause the armature to produce a first portion of the force;

a second conductor coil wrapped around the armature and connected to the source of second signal to cause the armature to produce a second and smaller portion of the force, wherein the first portion of the force is at least an order of magnitude greater than the second portion of the force; and a filter connected between the source of first signal and the first conductor coil operable to filter out the noise.

2. A multi-resolution drive comprising:

a device to be positioned, said device being subjected to undesirable vibration;

an actuator operable to exert a force F;

a controller having a first output indicative of the desired position of the device;

a first amplifier connected to receive the first output and operable to amplify the first signal so as to produce a first control, $I_{coarse}$, in accordance the desired position of the device;

a vibration sensor connected to the device and to the controller to produce a signal to the controller indicative of the vibration experienced by the device, the controller having a second output indicative of the vibration; and a second amplifier connected to receive the second output and produce a second control, $I_{fine}$, in accordance with the vibration of the device.

3. Apparatus according to claim 2 wherein the actuator is a voice coil type actuator with:

a first coil of N turns wrapped around the armature to produce a first control effort; and a second coil of n turns wrapped around the armature to produce a second control effort.

4. Apparatus according to claim 3 wherein N is at least an order of magnitude greater than n.

5. Apparatus according to claim 2 wherein the first amplifier includes a low pass filter to remove the noise in the amplified first signal.

6. A multi-resolution drive according to claim 2 wherein the controller has a third output and wherein a third amplifier is connected to receive the a third output and produce a third control in accordance therewith.

7. The multi-resolution drive according to claim 6 wherein the third output is an order of magnitude smaller than the second output.

8. The method of controlling the motion of an actuator with two signals, the first of which would contain noise that would mask the second comprising the steps of:

separately filtering the noise from the first signal;

connecting the filtered first signal to the actuator; and independently connecting the second signal to the actuator so that the motion of the actuator has a first portion dependent on the magnitude of the filtered first signal and has a second, smaller portion dependent on the magnitude of the second signal.

9. The method of claim 8 wherein the first signal is at least an order of magnitude greater than the second signal.

10. The method according to claim 8 further including the step of independently connecting a third signal to the actuator so that the motion of the actuator has a first portion dependent on the magnitude of the filtered first signal, has a second, smaller portion dependent on the magnitude of the second signal and has a a third, yet smaller portion dependent on the magnitude of the third signal.

* * * * *